United States Patent
Kirby

(10) Patent No.: US 8,151,934 B2
(45) Date of Patent: Apr. 10, 2012

(54) PORTABLE OBSERVATION TOWER AND SYSTEM FOR OPERATION

(76) Inventor: Jerry Kirby, Pleasanton, TX (US)

( * ) Notice: Subject to any disclaimer, the term of this patent is extended or adjusted under 35 U.S.C. 154(b) by 1517 days.

(21) Appl. No.: 11/401,569

(22) Filed: Apr. 11, 2006

(65) Prior Publication Data
US 2007/0029136 A1 Feb. 8, 2007

Related U.S. Application Data

(60) Provisional application No. 60/705,352, filed on Aug. 4, 2005, provisional application No. 60/740,497, filed on Nov. 29, 2005.

(51) Int. Cl.
E04C 1/00 (2006.01)
(52) U.S. Cl. .................................. 182/63.1; 182/127
(58) Field of Classification Search ................ 182/63.1, 182/127
See application file for complete search history.

(56) References Cited

U.S. PATENT DOCUMENTS

| | | | | |
|---|---|---|---|---|
| 369,148 A * | 8/1887 | Wright | ............. | 182/17 |
| 2,186,119 A * | 1/1940 | Moen | ............. | 182/17 |
| 3,612,218 A * | 10/1971 | Blair et al. | ............. | 182/127 |
| 3,731,947 A * | 5/1973 | Fontaine | ............. | 280/641 |
| 4,125,173 A * | 11/1978 | Rust et al. | ............. | 182/69.6 |
| 4,569,416 A * | 2/1986 | Stokoe | ............. | 182/2.9 |
| 5,295,555 A * | 3/1994 | Strange | ............. | 182/2.5 |
| 5,409,081 A * | 4/1995 | Reeves | ............. | 182/63.1 |
| 6,523,641 B2 * | 2/2003 | Smith | ............. | 182/63.1 |
| 6,604,606 B1 * | 8/2003 | McDougal et al. | ............. | 182/127 |
| 6,637,549 B1 * | 10/2003 | Lopacki | ............. | 182/127 |
| 6,739,428 B1 * | 5/2004 | Holmes et al. | ............. | 182/127 |
| 7,097,193 B1 * | 8/2006 | Sievert | ............. | 280/441.2 |
| 7,194,842 B2 * | 3/2007 | Baird | ............. | 52/125.2 |
| 2002/0134620 A1 * | 9/2002 | Meyer | ............. | 182/127 |
| 2002/0139613 A1 * | 10/2002 | Hardy et al. | ............. | 182/63.1 |
| 2002/0157899 A1 * | 10/2002 | Smith | ............. | 182/63.1 |
| 2006/0162999 A1 * | 7/2006 | Atkins | ............. | 182/63.1 |
| 2006/0260871 A1 * | 11/2006 | Davis | ............. | 182/127 |
| 2007/0029136 A1 * | 2/2007 | Kirby | ............. | 182/63.1 |
| 2008/0302601 A1 * | 12/2008 | Baker | ............. | 182/69.4 |
| 2009/0101438 A1 * | 4/2009 | Davis | ............. | 182/141 |
| 2009/0107762 A1 * | 4/2009 | Davis | ............. | 182/63.1 |

OTHER PUBLICATIONS http://web.archive.org/web/*/http://www.trailertower.com Mar. 21, 2004.*
www.trailertower.com, 28pages.

* cited by examiner

Primary Examiner — Katherine W Mitchell
Assistant Examiner — Candace L Bradford

(57) ABSTRACT

A portable observation tower and system of raising and lowering the tower is disclosed. The tower has a tower box with two fixed sectioned front legs and two hinged sectioned back legs. To raise the tower front legs are pulled toward back legs with a winch system mounted on a trailer hitch system. Rolling landing gear is lowered and drawn by winch to a front most locking position. This raises the mid section of tower box reducing the angle of front legs to back legs. Once complete the winch line can be attached to an axle of back legs to draw back legs to front legs. This process elevates tower to its full upright position. Wheels are provided on back legs and on trailer hitch system for movement of the tower. The lowering process occurs in reverse order of the raising process.

16 Claims, 7 Drawing Sheets

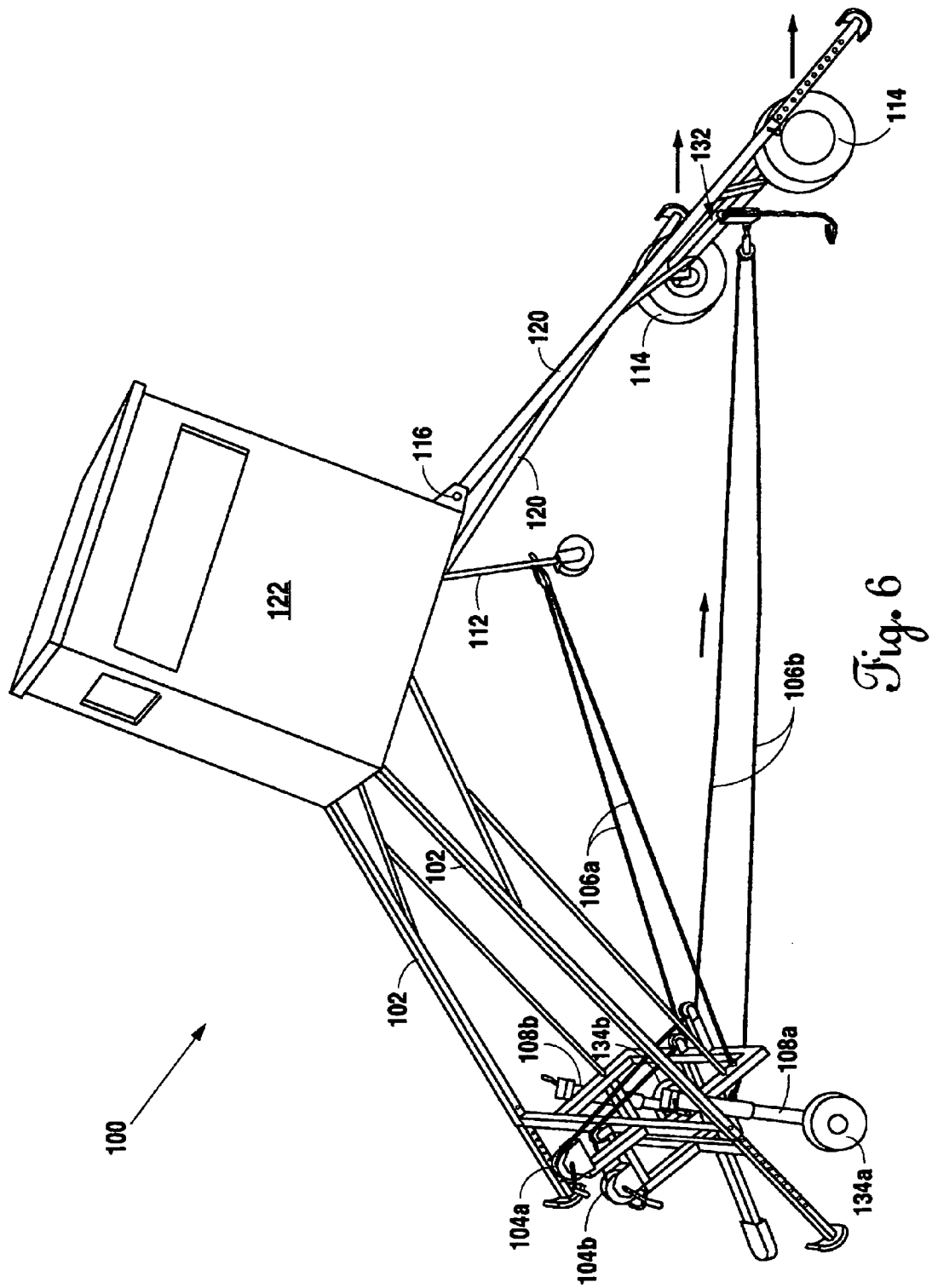

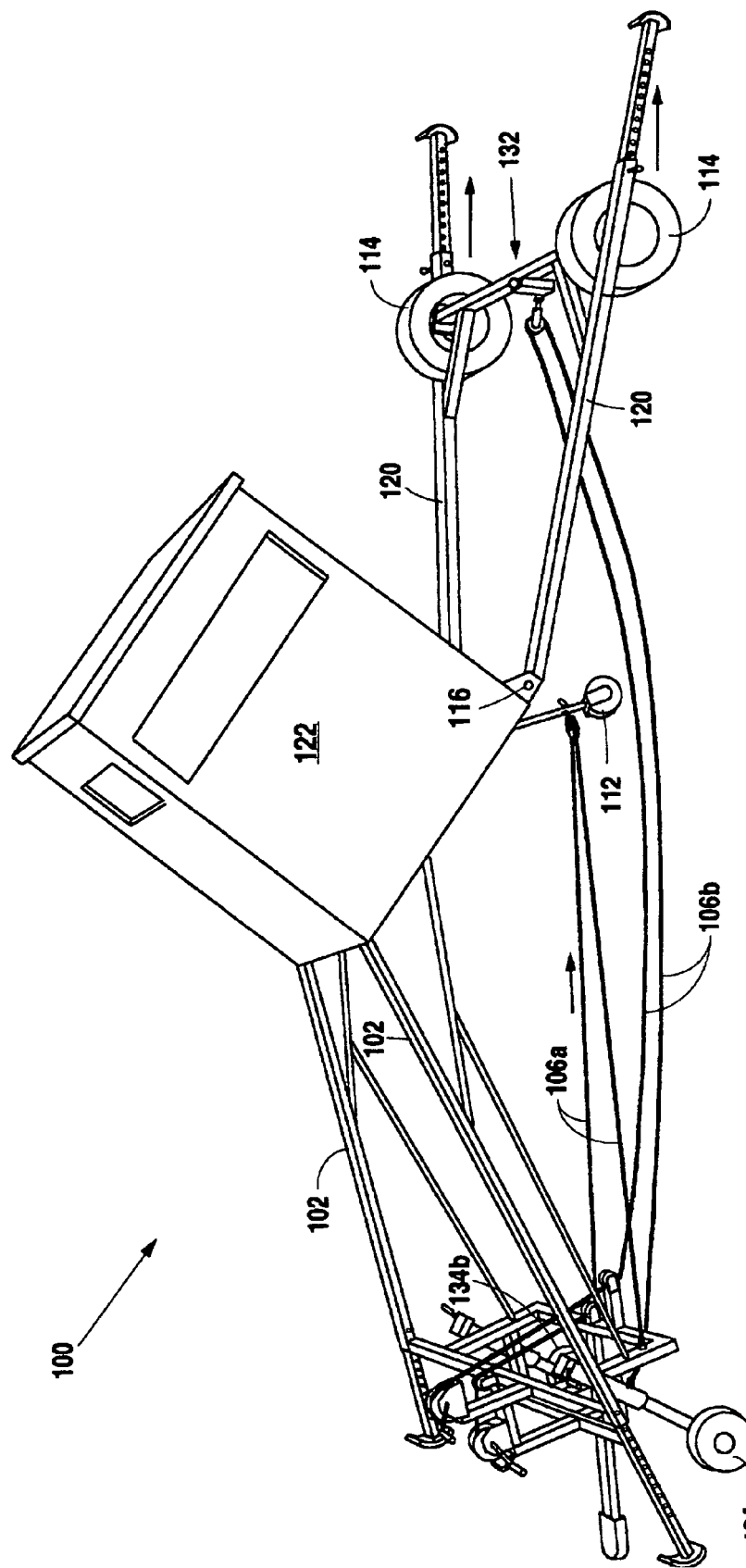

PORTABLE OBSERVATION TOWER AND SYSTEM FOR OPERATION

This application claims priority to U.S. Provisional Application Ser. No. 60/705,352 filed Aug. 4, 2005 and U.S. Provisional Application Ser. No. 60/740,497 filed Nov. 29, 2005.

BACKGROUND OF THE INVENTION

1. Field of the Invention

Applicant's invention relates to an observation tower. More specifically, the present invention relates to an observation tower that can be easily moved from once place to another and erected on site with minimal effort.

2. Background Information

Observation towers are useful to users because such towers permit a wide view of their surroundings. The typical observation tower is designed in a rigid manner requiring that the user take special efforts to find the ideal location for placement because moving such a tower can be cumbersome. In addition, the typical tower requires a large amount of time to assemble and erect. Unfortunately most users are in need of observation towers that can be placed in less than ideal locations within a small time window. The present invention satisfies this need by providing a portable observation tower that can be moved from site to site easily and erected in less than ideal locations without a lot of time expended.

SUMMARY OF THE INVENTION

The preferred embodiment of the present invention includes a portable observation tower and a system of raising and lowering the portable observation tower. The tower has a tower box. There are two front legs attached in a fixed position to the tower box. There are two back legs attached on a hinge system to the tower box which allows the back legs to swivel in relation to the tower box. Each leg of the tower has two sections. A first section of the legs is telescoped inside a second section to reduce the overall length and width of the legs and the tower as a whole. Once the desired length for the legs is acquired, a locking pin will fix the legs into the desired position. In raising the tower, the front legs are pulled toward the back legs with a winch system that is mounted on a front trailer hitch system on the front legs. By pulling in this manner, the tower will raise to a vertical upright position.

More specifically, the angle between the front legs and the back legs is almost 180 degrees so rolling landing gear is used to be lowered and drawn by the a winch to a frontmost position. The rolling landing gear is installed adjacent the hinge system of the back legs. The rolling landing gear is attached by way of a winch line to a winch. By lowering the rolling landing gear and pulling it forward with the winch line to a locking position (slanted toward the front legs) the rolling landing gear raises the mid section of the tower box and thereby reduces the angle of the front legs to the back legs. Once this is completed a winch line is attached to an axle of the back legs to draw the back legs to the front legs by way of a winch. By drawing the front and back legs together the tower is elevated to its full upright position.

There are trailer wheels mounted on the back legs which aid in forward movement of the back legs toward the front legs. There is also a screw type trailer jack mounted on the front trailer hitch system which has a rolling wheel that aids in the rearward movement of the front legs toward the back legs in the raising process. The lowering process occurs in reverse order of the raising process. The wheels and winch are also used in reverse order for the lowering process.

BRIEF DESCRIPTION OF THE DRAWINGS

FIG. 6 is a perspective view of the preferred embodiment of the present invention at the beginning of the lowering process.

FIG. 7 is a perspective view of the preferred embodiment of the present invention during the lowering process showing the front legs pulled forward.

DETAILED DESCRIPTION OF THE PREFERRED EMBODIMENT

Figure 1:
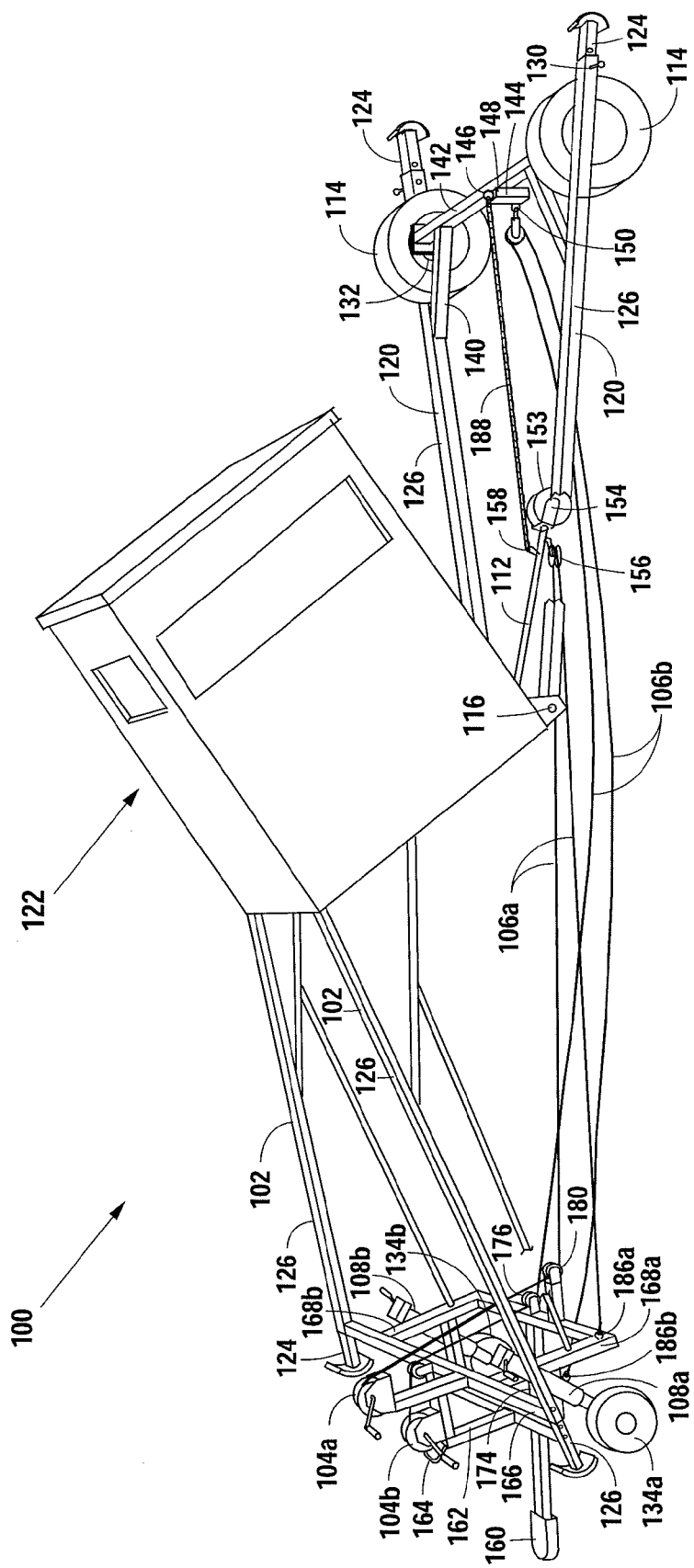
FIG. 1 is a perspective view of the preferred embodiment of the present invention in its trailer configuration.

In FIG. 1 a perspective view of the preferred embodiment of the present invention in its trailer configuration is shown. The portable observation tower 100 is provided with a tower box 122 having two front legs 102 and two back legs 120. The two front legs 102 are attached at one end in a fixed position to the tower box 122. The two back legs 120 are attached at one end on a hinge system 116 to the tower box 122. The hinge system 116 allows the back legs 120 to swivel in relation to the tower box 122. Back leg trailer wheels 114 are provided to aid movement of front legs 102 in relation to back legs 120. Back leg trailer wheels 114 connect to wheel bars 142. Wheel bars 142 are attached to axle 132. Centrally positioned along axle 132 is winch line post 144. Winch line post 144 lies perpendicular to axle 132 and has a first eye 146 at its upper end 148 and a second eye 150 positioned along the side of the base of the winch line post 144. Second winch line 106b attaches to second eye 150 and will be discussed herein.

Both the front legs 102 and the back legs 120 preferably have two telescoping sections. A first section 124 of the front legs 102 and back legs 120 is telescoped inside a second section 126 to reduce the overall length and width of the portable observation tower 100. Openings 128 are provided along the length of the first section 124 of front legs 102 and back legs 120 while openings 130 are provided along the length of the second section 126 of front legs 102 and back legs 120. Both openings 128 and 130 accommodate appropriately sized locking pins (not shown). First section 124 and second section 126 can be moved in relation to each other to adjust any of the front legs 102 or back legs 120. Once the desired length for the leg(s) is acquired, a locking pin (not shown) will fix the appropriate leg(s) into the desired position. At a lower portion of the second section 126 of back legs 120 are support legs 140 which extend downward at an angle from back legs 120 and attach to opposing sides of axle 132. Optional leveling jacks (not shown) may be attached to each of said front legs 102 and said back legs 120. Optional outriggers (not shown) may be used on front legs 102 and back legs 120 to extend the base of the invention.

In the trailer configuration as show in this figure, both front legs 102 and back legs 120 are retracted to a portable length. The first and second winches 104a and 104b, first and second winch lines 106a and 106, first and second jacks 108a and 108b with jack wheels 134a and 134b, trailer hitch 110, and rolling landing gear 112 are provided for use in raising and lowering the portable observation tower 100. During transport the first and second jacks 108a and 108b with jack wheels 134a and 134b are in a retracted position. The rolling landing gear 112 is held up by a chain mechanism 138 attached to axle 132. By using the two jacks 108a and 108b with wheels 134a and 134b, first section 124 of front legs 102 can be removed if necessary.

Figure 2:
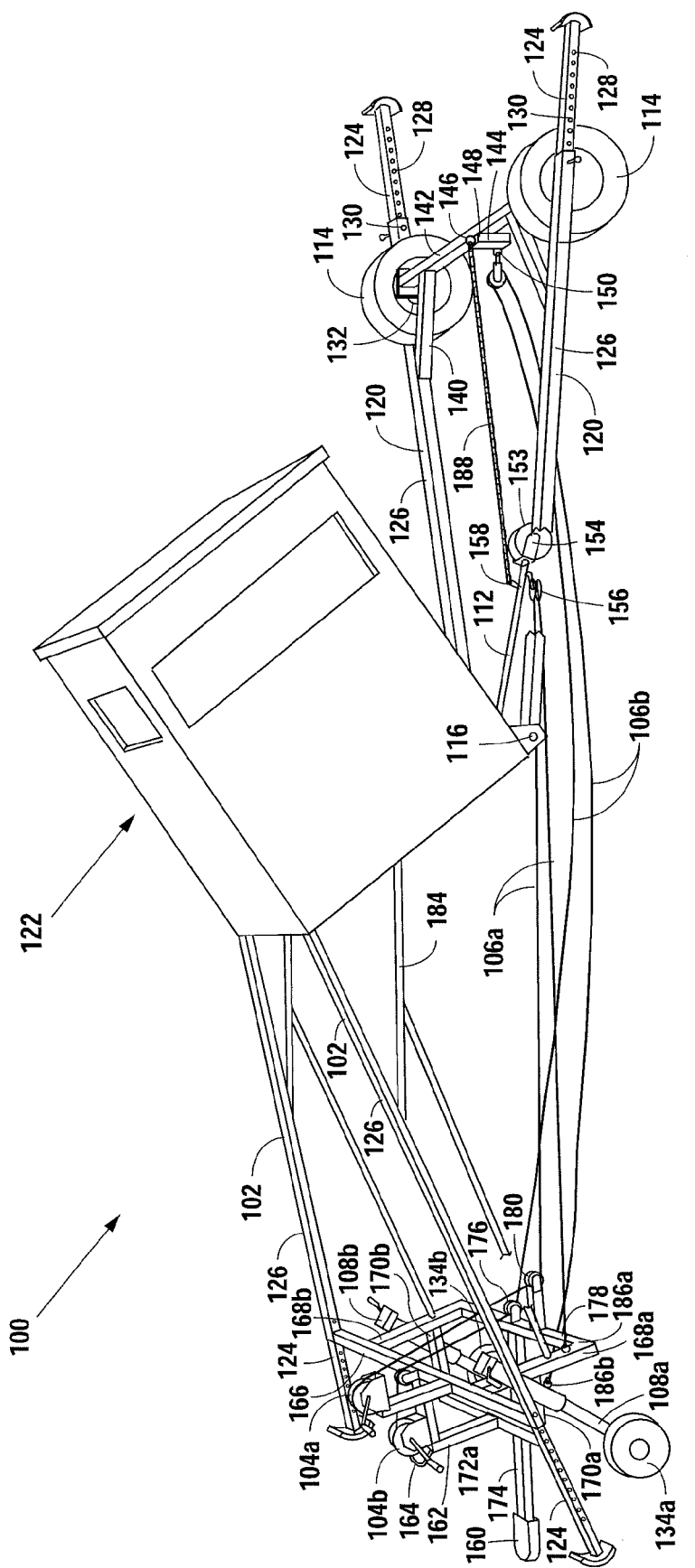
FIG. 2 is a perspective view of the preferred embodiment of the present invention during the first step of the raising process.

FIG. 2 is a perspective view of the preferred embodiment of the present invention during the first step of the raising process. Both front legs 102 and back legs 120 are extended to their full position by moving first section 124 in relation to second section 126 for each leg and locking each leg into position with a locking pin (not shown). After extending the front legs 102 and back legs 120, the first winch line 106a is hooked onto the rolling landing gear 112. The rolling landing gear 112 is positioned adjacent the hinge system 116 of the back legs 120. The rolling landing gear 112 consists of a hinged Y-member 154 extending underneath the backside of tower box 122. At the base of hinged Y-member 154 is wheel 153. Positioned to the front of landing gear 112 is eye 156. First winch line 106a attaches at eye 156 for moving landing gear 112. An eye 158 positioned to the back of landing gear 112 connects to chain 188 which links to hook 190 forming a chain mechanism 138. Once the landing gear 112 is positioned, the wheel 152 of the rolling landing gear 112 is then winched to its forward most position with first winch line 106a using first winch 104a. First winch 104a can be either manual or electric. A screw type jack (not shown) may be used in place of the rolling landing gear 112. In another embodiment, the rolling landing gear 112 can be eliminated altogether. By running the first winch line 106a down vertically to a lower pulley 176 and then towards the axle 132 to a point lower than the axle 132, tower 100 can be raised without the use of rolling landing gear.

The present invention provides for two embodiments of a winch system. In the preferred embodiment a first winch 104a and a second winch 104b are provided with first winch 104a having a first winch line 106a and second winch 104b having a second winch line 106b. First winch line 106a is attached to rolling landing gear 112 at one end of the line and the other end of the line attached to an eye 186a positioned on support leg 168a. Second winch line 106b is attached to axle 132 at one end of the line and at the other end of the line attached to an eye 186b positioned on jack 108a. In a second embodiment one winch 104 and one winch line 106 are provided. In the raising process the winch line is attached to rolling landing gear 112 and the axle 132 in sequential steps to raise tower 100. The second embodiment works just as well as the preferred embodiment but has fewer components.

For the winch system, first winch 104a is positioned on a first support bar 166 which connects both front legs 102. Positioned downward and perpendicular to first support bar 166 are support legs 168a and 168b. Both support legs 168a and 168b connect to second support bars 170a and 170b. Second support bars 170a and 170b connect to third support bars 172a and 172b which terminate into handle post 162. Handle post 162 has handle 164 at its topmost point. To the front and perpendicular to handle post 162 is trailer hitch 160 which is used to hitch the present invention to a truck to be moved. To the back and perpendicular to handle post 162 is back support 174. Back support 174 has a pulley 176 positioned thereon to feed second winch line 106b into second winch 104b. Second winch 104b can be either manual or electric. Positioned between second support bars 170a and 170b is fourth support bar 178. Attached to the back of the fourth support bar 178 is a pulley 180 to feed first winch line 106a into first winch 104a. Front leg supports 182 connect between support legs 168a and 168b to front legs 102. Leg supports 184 connect between front legs 102 and tower box 122.

Figure 3:
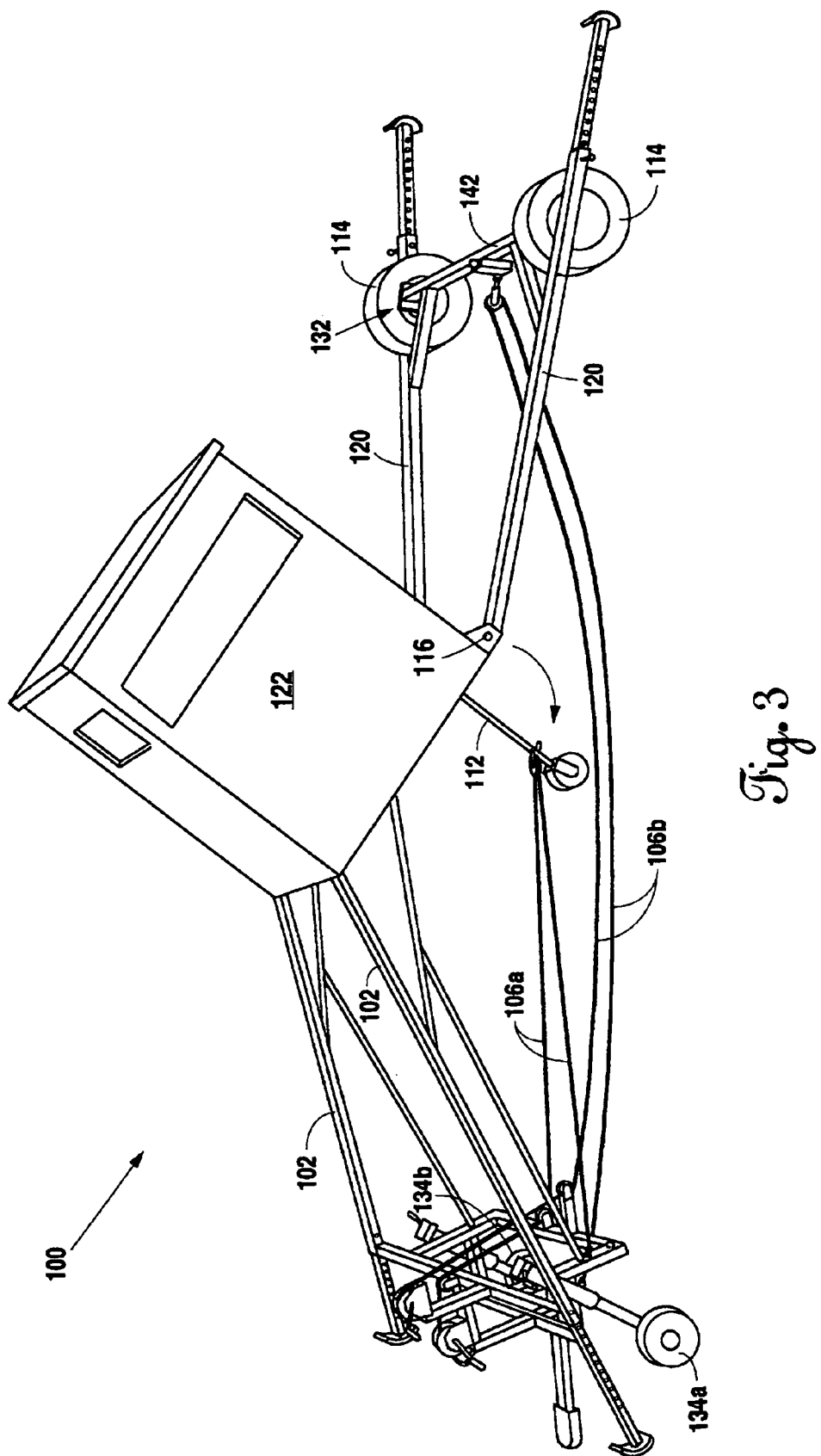
FIG. 3 is a perspective view of the preferred embodiment of the present invention during the raising process showing movement of rolling landing gear to the forward most position.

In FIG. 3 a perspective view of the preferred embodiment of the present invention during the raising process showing movement of rolling landing gear 112 to the forward most position is shown. Once the rolling landing gear 112 has been moved to its forward most position it is then locked into place at a position slanted toward the front legs 102. This step raises the mid section of the tower box 122 and thereby reduces the angle of the front legs 102 to the back legs 120. Once this step is completed the second winch line 106b can be attached to an axle 132 for the trailer wheels 114 of the back legs 120 to draw the back legs 120 to the front legs 102.

Figure 4:
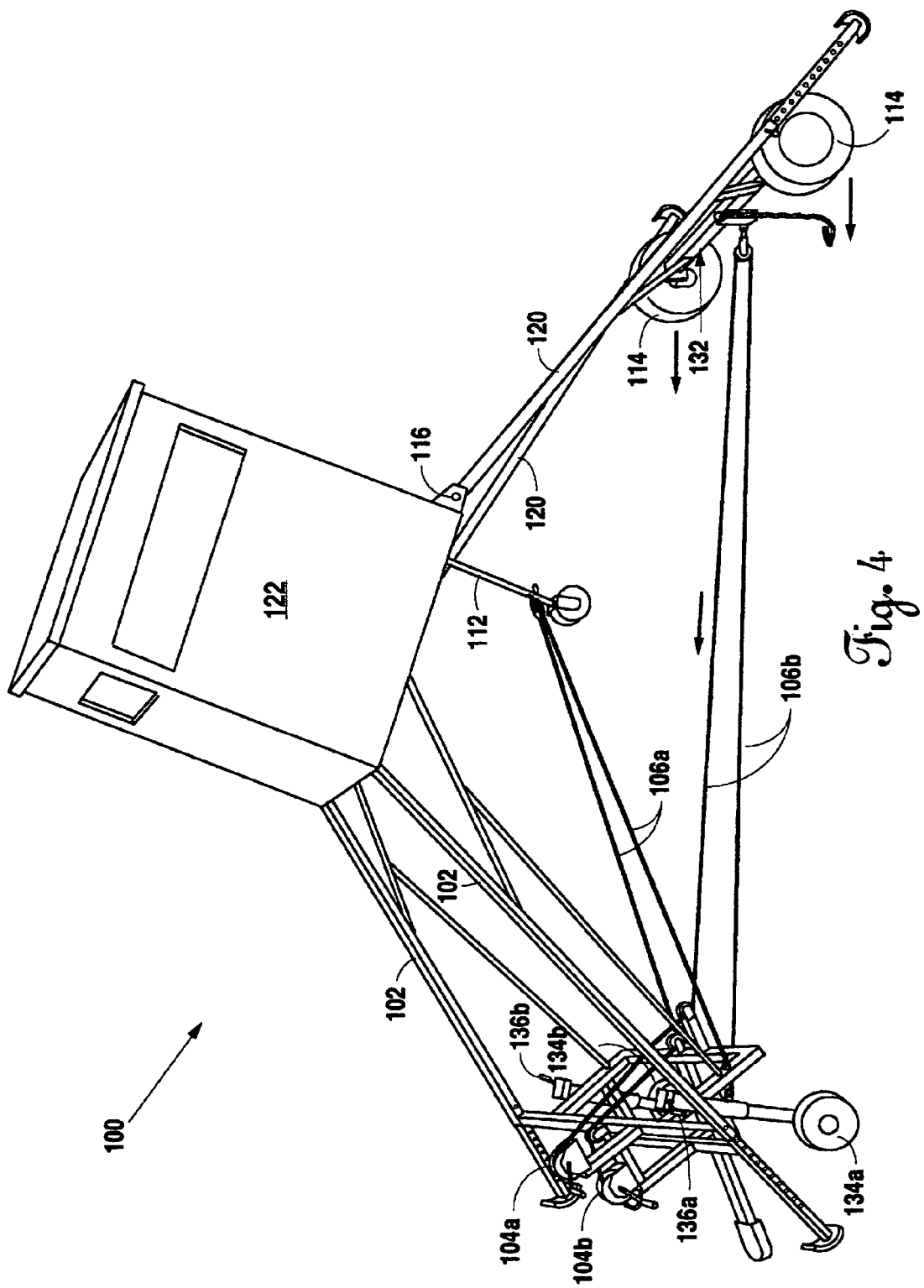
FIG. 4 is a perspective view of the preferred embodiment of the present invention during the raising process showing the winch line pulling the back legs forward.

FIG. 4 is a perspective view of the preferred embodiment of the present invention during the raising process showing the second winch line 106b pulling the back legs 120 forward. At this step the second winch line 106b attached to the axle 132 for the trailer wheels 114 is used to pull the back legs 120 forward to a point where both the front legs 102 and the back legs 120 are in contact with the ground. The second winch line 106b is pulled toward the front of the tower 100 by way of second winch 104b. Crank mechanisms 136a and 136b positioned on first and second jacks 108a and 108b are actuated to lower the jack wheels 134a and 134b. The crank mechanisms 136a and 136b can be used for both raising and lowering the jack wheels 134a and 134b. The jack wheels 134a and 134b will be lowered to a point when the front legs 102 no longer touch the ground. The jack wheels 134a and 134b will allow the front legs 102 to be moved toward the back legs 120 to raise the tower 100 into its upmost position. At this stage the rolling landing gear 112 is off of the ground.

The present invention provides for two embodiments of a jack system. In the preferred embodiment a first crank mechanism 136a and a second crank mechanism 136b are provided on first 108a and second 108b jacks respectively attached to first 134a and second 134b jack wheels positioned to the left and right of the front of tower 100. In a second embodiment only one crank mechanism 136 is provided on jack 108 attached to jack wheel 134 which is positioned centrally at the front of tower 100.

Figure 5:
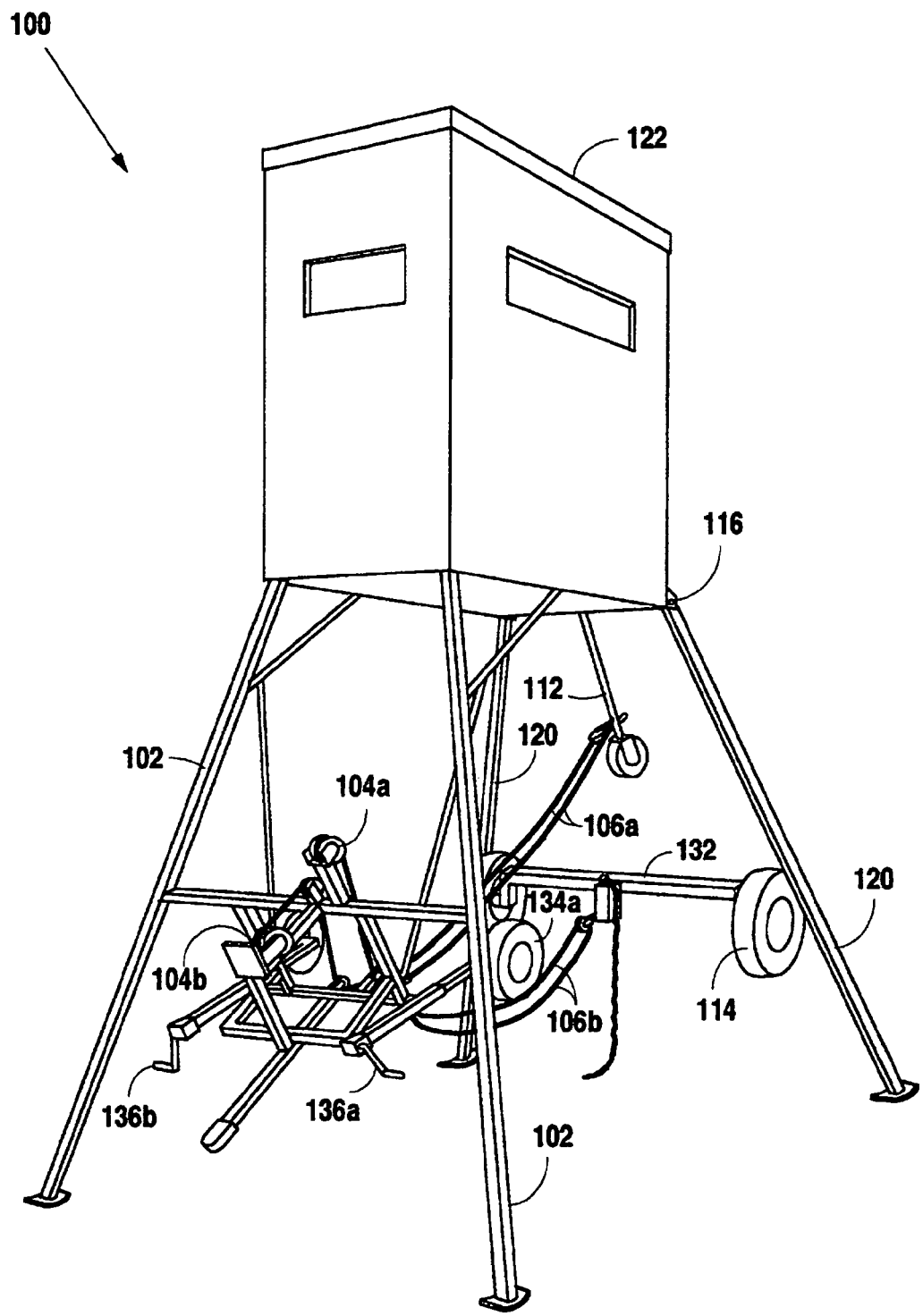
FIG. 5 is a perspective view of the preferred embodiment of the present invention at the completion of the raising process with the tower in its fully upright position.

In FIG. 5 a perspective view of the preferred embodiment of the present invention at the completion of the raising process with the tower 100 in its fully upright position is shown. The tower box 122 is shown with both front legs 102 and back legs 120 contacting the ground. Second winch line 106b is still attached to axle 132. Trailer wheels 114 are in a raised position as is the rolling landing gear 112. Once the tower 100 is at its fully upright position jacks 108a and 108b are retracted by screwing them up and allowing the front legs 102 to rest on the ground. Jack wheels 134a and 134b are still in contact with the ground. Appropriate bracing (not shown) will be put in position to keep tower 100 in a fixed position.

In FIG. 6 a perspective view of the preferred embodiment of the present invention at the beginning of the lowering process. At the beginning of the lowering process the jacks 108a and 108b will be screwed down until jack wheels 134a and 134b are touching the ground and the front legs 102 are no longer touching the ground. Next the rolling landing gear 112 will be locked into a second position which is slightly rearward of the tower box 122. Second winch line 106b is hooked onto the rear axle 132 of the trailer wheels 114 of back legs 120. Jack wheels 134a and 134b are used to pull front legs 102 forward and the second winch line 106b is slowly let out.

FIG. 7 is a perspective view of the preferred embodiment of the present invention during the lowering process showing the front legs 102 pulled forward. At this step the front legs 102 will continue to be pulled forward and the second winch line 106b will slowly be let out until rolling landing gear 112 touches the ground and the weight of the tower 100 rests on the rolling landing gear 112. Next, the second winch line 106b is removed from the axle 132 of trailer wheels 114 of back legs 120 and first winch line 106a is attached to the rolling landing gear 112. The front legs 102 will continue to be moved forward and more first winch line 106a will be let out until tower 100 is resting on trailer wheels 114. The movement forward will continue until tower 100 is back in its trailer configuration shown in FIG. 1. Both front legs 102 and back legs 120 can be adjusted to reduce the overall profile of the tower 100 as it is moved to another location.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A portable observation tower comprising:
   a tower box;
   two fixed front legs attached to the front of said tower box;
   two hinged back legs attached to the back of said tower box;
   back wheels attached to said back legs and connected together by way of an axle;
   at least one winch positioned to the front of said tower box, said winch actuating at least one winch line to raise and lower said portable observation tower;
   said at least one winch line connecting to said axle and actuated by said winch;
   at least one jack having at least one wheel positioned to the front of said tower, said at least one jack being adjustable to raise and lower said at least one wheel such that said at least one wheel contacts the ground and raises said two fixed front legs off of the ground during raising and lowering of the portable observation tower;
   said at least one wheel of said at least one jack being retractable when said portable observation tower is in a raised position such that said front legs contact the ground; and
   a trailer hitch adjacent said winch.

2. The portable observation tower of claim 1 wherein said front legs and said back legs are adjustable in length.

3. The portable observation tower of claim 1 wherein said at least one jack further comprises a crank mechanism for actuating said jack.

4. The portable observation tower of claim 1 further comprising at least one pulley attached in front of said front legs for feeding said at least one winch line to said at least one winch.

5. The portable observation tower of claim 1 further comprising at least one support member attached to the front of said front legs for attaching said at least one winch and said at least one pulley.

6. The portable observation tower of claim 1 further comprising a handle positioned to the front of said at least one support member.

7. The portable observation tower of claim 1 further comprising rolling landing gear positioned below said tower box.

8. The portable observation tower of claim 7 further comprising a connection member positioned between said axle and said rolling landing gear.

9. The portable observation tower of claim 8 wherein said rolling landing gear is comprised of a Y-shaped member for connection of said rolling landing gear to said tower box.

10. A portable observation tower comprising:
    two fixed front legs;
    two hinged back legs adjacent said front legs, said back legs being hingedly attached to a back side of said tower box;
    back wheels attached to said back legs and connected together by way of an axle;
    at least one winch positioned to the front of said front legs, said winch actuating at least one winch line to raise and lower said portable observation tower;
    said at least one winch line connecting to said axle and actuated by said winch;
    at least one jack having at least one wheel positioned to the front of said tower, said at least one jack being adjustable to raise and lower said at least one wheel such that said at least one wheel contacts the ground and raises said two fixed front legs off of the ground during raising and lowering of the portable observation tower;
    said at least one wheel on said at least one jack being retractable when said portable observation tower is raised such that said front legs contact the ground; and
    a trailer hitch adjacent said winch.

11. The portable observation tower of claim 10 further comprising a tower box attached to said front legs and said back legs.

12. A process for operating a portable observation tower comprising the steps of:
    raising said portable observation tower by performing the steps of:
    connecting a winch line from a winch to an axle disposed adjacent and connecting two hinged back legs of said portable observation tower;
    actuating at least one jack to lower at least one jack wheel such that said at least one jack wheel touches the ground and front legs of said portable observation tower no longer touch the ground, said at least one jack and said at least one jack wheel being disposed adjacent said front legs;
    operating said winch to pull said front legs toward said back legs;
    retracting said at least one jack to retract said at least one jack wheel such that said front legs rest on the ground; and
    lowering said portable observation tower by performing the steps of:
    actuating said at least one jack to lower said at least one jack wheel such that said at least one jack wheel touches the ground and said front legs no longer touch the ground;
    pulling said front legs forward until said back legs are fully hinged and said portable observation tower is resting on trailer wheels which are connected to said axle.

13. The process for operating a portable observation tower of claim 12 wherein said pulling said front legs forward step further comprises loosening said winch line from said winch.

14. The process for operating a portable observation tower of claim 13 wherein said raising step further comprises the step of adjusting said front legs and said back legs to desired lengths.

15. The process for operating a portable observation tower of claim 13 wherein said raising step further comprises the step of securing said tower to maintain a fixed position.

16. The process for operating a portable observation tower of claim 13 wherein said raising step further comprises the steps of:
   connecting rolling landing gear to at least one winch with at least one winch line; and
   pulling said landing gear into a locking position.

* * * * *